(12) United States Patent
Kuhary

(10) Patent No.: US 7,178,810 B1
(45) Date of Patent: Feb. 20, 2007

(54) MOUNTING ARRANGEMENT FOR INFLATABLE SEALS

(75) Inventor: Daniel B. Kuhary, Kent, CT (US)

(73) Assignee: The Presray Corporation, Pawling, NY (US)

( * ) Notice: Subject to any disclaimer, the term of this patent is extended or adjusted under 35 U.S.C. 154(b) by 288 days.

(21) Appl. No.: 10/979,429

(22) Filed: Nov. 2, 2004

(51) Int. Cl.
*F16J 15/48* (2006.01)

(52) U.S. Cl. .................. 277/646; 277/637; 277/921; 49/477.1; 49/489.1

(58) Field of Classification Search .............. 277/646, 277/637, 921, 628, 630, 641, 642; 49/477.1, 49/489.1, 490.1
See application file for complete search history.

(56) References Cited

U.S. PATENT DOCUMENTS

| | | | |
|---|---|---|---|
| 2,679,077 A | | 5/1954 | Immel et al. |
| 2,720,011 A | * | 10/1955 | Krupp ........................ 49/477.1 |
| 3,178,779 A | * | 4/1965 | Clark et al. .................. 277/646 |
| 3,397,490 A | | 8/1968 | Carlson |
| 3,763,595 A | | 10/1973 | Sudyk |
| 3,788,004 A | | 1/1974 | Billeri et al. |
| 3,855,733 A | | 12/1974 | Miller |
| 3,984,942 A | | 10/1976 | Schroth |
| 4,441,278 A | | 4/1984 | Covey, III |
| 4,458,376 A | | 7/1984 | Sitko |
| 5,209,498 A | * | 5/1993 | Colin ......................... 277/646 |
| 6,185,869 B1 | | 2/2001 | Kawai |
| 6,942,224 B2 | * | 9/2005 | Ludwig et al. ............. 277/637 |

* cited by examiner

*Primary Examiner*—William L. Miller
(74) *Attorney, Agent, or Firm*—Schweitzer Cornman Gross & Bondell LLP

(57) ABSTRACT

A closure seal for doors, hatches and the like comprising a pneumatically inflatable sealing element of generally known configuration housed in a specially constructed channel-shaped retainer. The sealing element comprises a flat, relatively stiff base portion of predetermined width and a flexible portion comprising spaced apart side walls, joined with the base, and an outer wall joining with the side walls to form a hollow expandable section. The base forms shoulders where it joins with the side walls. A retaining channel, formed of sheet metal and of generally U-shaped cross section, receives the sealing element and is formed with longitudinally spaced apart, opposed, inwardly projecting elements forming longitudinally spaced apart constrictions of slightly less width than the base of the sealing element. The sealing element is inserted in the retaining channel, with the base of the element being forced through the constrictions, and thereafter is retained in the channel by engagement of the shoulders of the base by the spaced apart projection pairs.

10 Claims, 4 Drawing Sheets

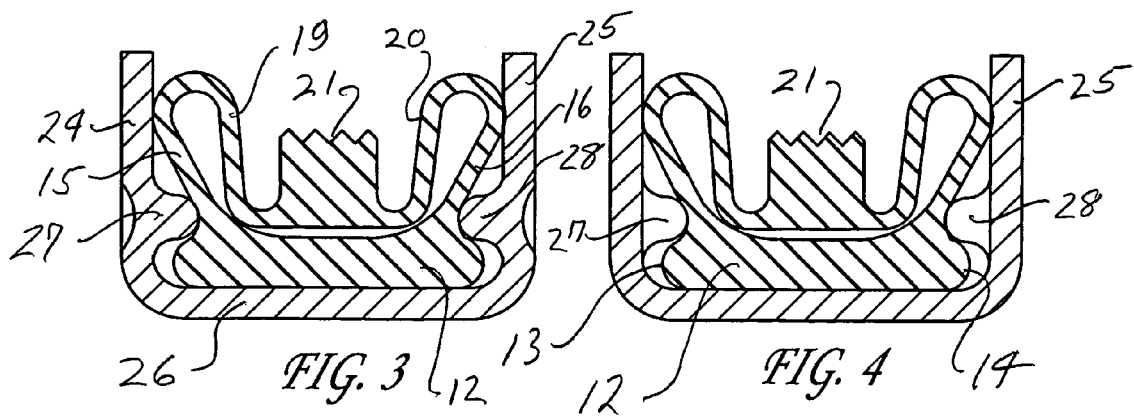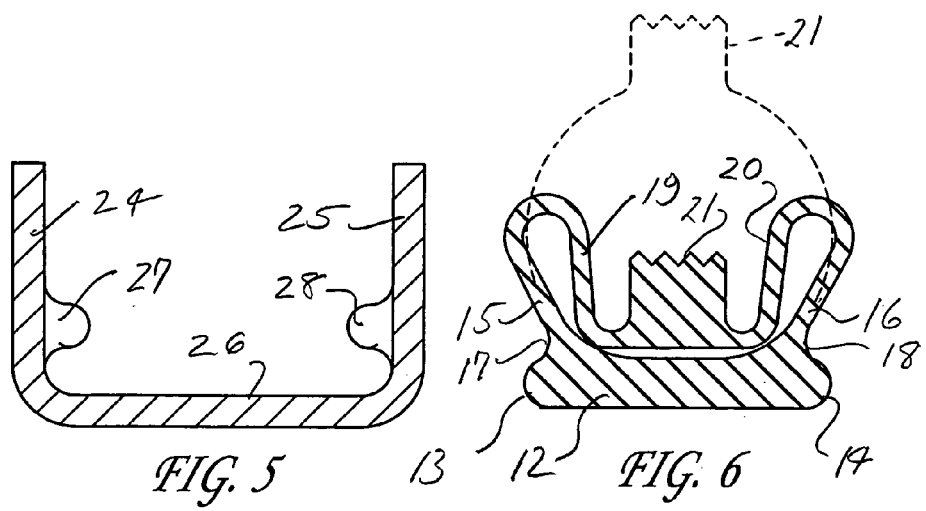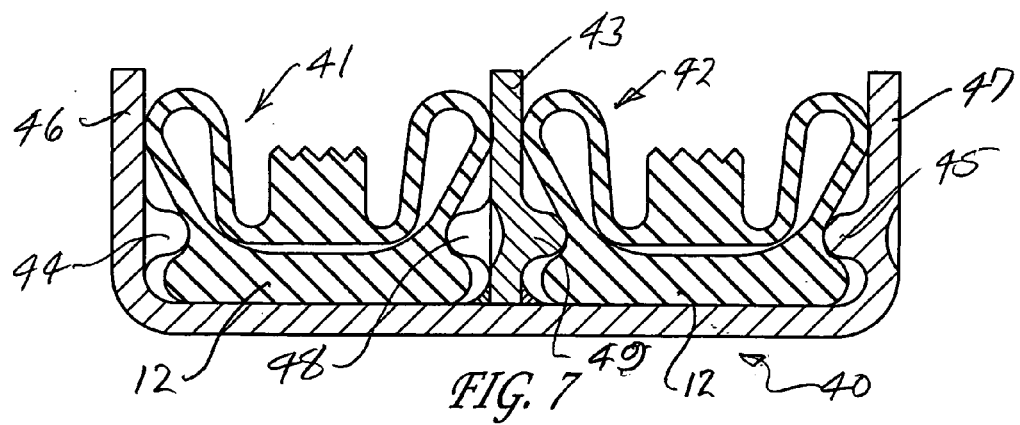

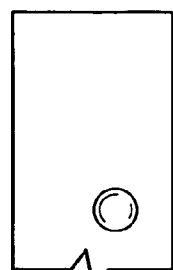
FIG. 8
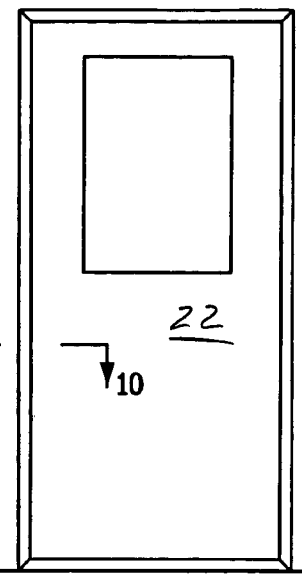
FIG. 9
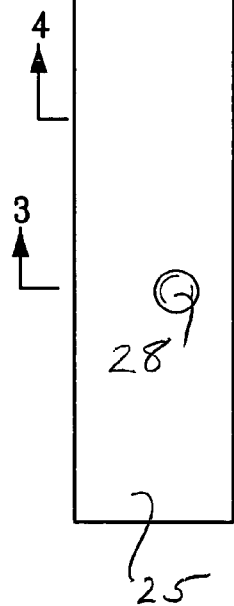
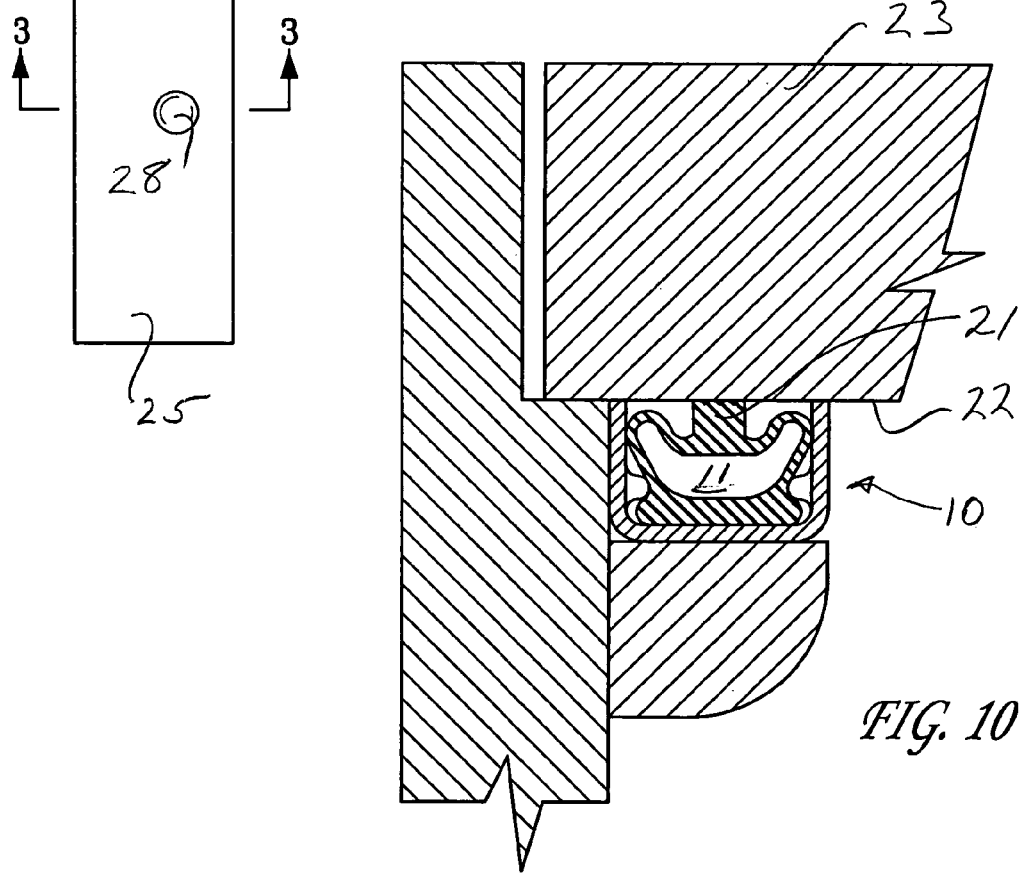
FIG. 10

MOUNTING ARRANGEMENT FOR INFLATABLE SEALS

BACKGROUND OF THE INVENTION

Inflatable seals are frequently used for the sealing of doors, hatches and the like against the passage of liquids or gases. In a typical installation, a hollow, inflatable elastomeric sealing element is mounted within a channel or other recess structure. A closure element, such as a door, hatch cover or the like can be moved into a nominally closed position, with surfaces thereof facing the inflatable sealing element. After positioning of the door or like in its nominally closed position, the sealing member is internally inflated and expanded to press tightly against the adjacent surface of the closure panel, to effect a tight, liquid and/or gas-proof seal.

Although the general technology of inflatable sealing elements is well known, the structures incorporating such sealing arrangements tend to be somewhat costly, and there has remained a need for less costly arrangements for incorporating inflatable seals for general purpose applications.

One heretofore known arrangement for installing inflatable seals in a door closure system is represented by the Carlson U.S. Pat. No. 3,397,490. In the Carlson patent, an inflatable sealing element is provided with a mounting flange at one side thereof which is engageable with retaining clips positioned in an alternating fashion along the path of the seal, with alternate clips being spaced apart longitudinally a distance of several inches. Installation of the seal is accomplished by displacing the seal first to one side and then the other as the mounting flange thereof is inserted progressively under individual mounting clips. A somewhat similar arrangement is shown in the Schroth U.S. Pat. No. 3,984,942. These systems, while very useful, require the mounting of the individual clips, which are welded or bolted in place.

SUMMARY OF INVENTION

Pursuant to the present invention, a novel and highly simplified yet effective structure is provided for mounting of inflatable sealing elements, in which both the hardware required and the installation procedure are highly simplified and economical as compared to prior arrangements, yet are wholly effective for the purposes intended.

In a preferred embodiment of the invention, an inflatable sealing element of generally well known construction is employed, which is a fabricated cross section having a base wall of significant thickness and strength, with an inflatable cross section being formed by relatively thinner, flexible side and outer walls. Typically, the outer wall includes a projecting rib adapted to make pressure contact with a confronting panel surface, such as of a door or hatch, in order to form a seal. The inflatable sealing element preferably is housed within a confining retainer, which is formed of sheet metal. The retainer is of generally U-shaped cross section, with side walls preferably slightly higher than the side walls of the inflatable seal in its deflated condition.

Pursuant to one embodiment of the invention, the side walls of the retainer are formed at spaced apart intervals with opposed pairs of localized projections which extend horizontally inward from the inner surfaces of the channel side walls to form a constricted area. The projections are spaced somewhat above the bottom wall of the channel and form a constriction of the normal space between the channel side walls. The geometry of the side walls and of the localized projections is such, in relation to the width and height of the base wall of the inflatable seal, as to allow the base wall to be forced with somewhat of a snap-in action into the channel, between opposed pairs of projections, which are separated by a distance somewhat less than the width of the base wall of the seal. Once the seal is seated in the bottom of the channel, the pairs of projections overlie edge portions of the base wall of the seal, effectively retaining the seal in its installed position within the channel. In one preferred embodiment of the invention, the projections are easily and inexpensively formed in the U-shaped retainer, using conventional dimpling machinery.

In a typical case, the pairs of localized projections may be spaced longitudinally a few inches apart, along the length of the retainer, depending of course on the dimensions of the inflatable seal element to be retained. The structure of the invention enables custom fabrications to be made quickly and inexpensively, forming the channel-like retainers of sheet metal and providing for easy installation and retention of the sealing element by means of easily formed pairs of projections provided along the length of the retainer.

In an alternative embodiment of the invention, the projections on one side wall of the channel may be formed in a continuous or partially continuous form while, on the opposite side of the channel, localized individual projections are formed at spaced-apart intervals. In this embodiment, the sealing element can be installed by tilting the element and inserting one edge of its base wall under the continuous or partially continuous projection, and thereafter forcing the opposite side through the resistance of the localized projections to complete the installation.

For certain applications, it is desirable to provide for redundant seals, to accommodate the possibility of loss of pressure on one of them. To this end, the system of the invention provides for the channel-like retainer to be formed essentially at a double width, in order to receive a pair of inflatable sealing elements on a side-by-side basis. A central divider can be installed in the double-width retainer, attached by welding or other means. Localized projections are provided in the side walls of the double-width retainer, and also in the central divider, such that each of the individual seals of the redundant pair is secured by opposed pairs of projections extending respectively from one side wall of the retainer and from the central divider. Alternatively, the central divider may comprise a continuous section of generally T-shaped cross section with the upper flanges of the "T" serving to engage and capture one edge of the base flanges of the redundant seals. In the last described alternative, the outer walls of the retainer are provided with longitudinally spaced apart localized projections. In a still further alternative, the central divider may be comprised of a plurality of longitudinally spaced apart individual "clips" of a T-shaped cross section, secured to the bottom wall of the primary retainer at locations opposed to the localized projections provided on the outer side walls of the retainer.

For a more complete understanding of the above and other features and advantages of the invention, reference should be made to the following detailed description of preferred embodiments of the invention, and also to the accompanying drawings.

DESCRIPTION OF THE DRAWINGS

FIGS. 3 and 4 are cross sectional views as taken generally on lines 3—3 and 4—4 respectively of FIG. 8.

FIG. 5 is a cross sectional view as taken generally on line 5—5 of FIG. 2.

FIG. 6 is a cross sectional view of the inflatable sealing element itself showing the sealing element in the principal view in a deflated condition and in dotted lines in a fully inflated condition.

FIG. 7 is a cross sectional view of a modified form of the invention for providing redundant seals.

FIG. 8 is a side elevational view of the retainer element.

FIG. 9 is an elevational view of a door structure incorporating an inflatable sealing element according to the invention.

FIG. 10 is an enlarged, fragmentary cross sectional view as taken on line 10—10 of FIG. 9.

DESCRIPTION OF PREFERRED EMBODIMENTS

Figure 1:
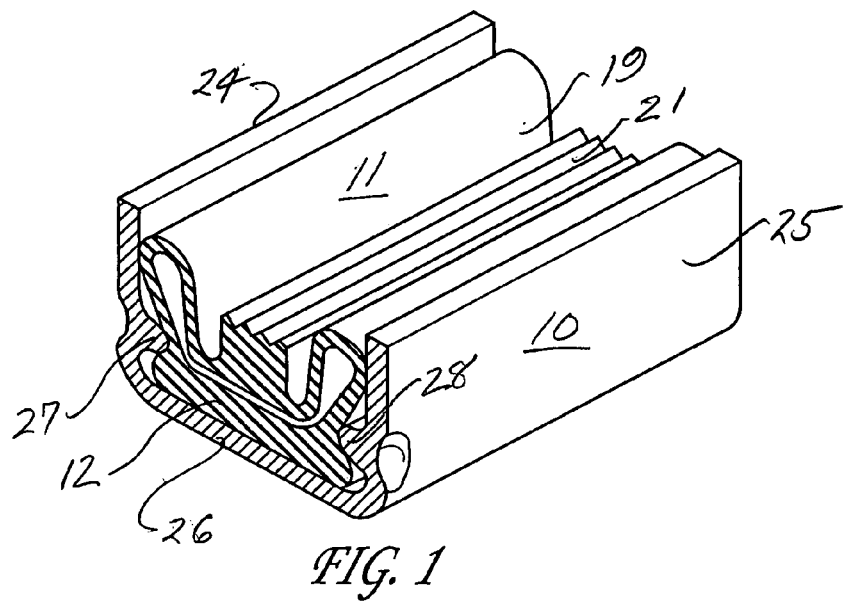
FIG. 1 is a perspective view in cross section of an assembly of retainer and inflatable seal pursuant to the present invention.
Figure 2:
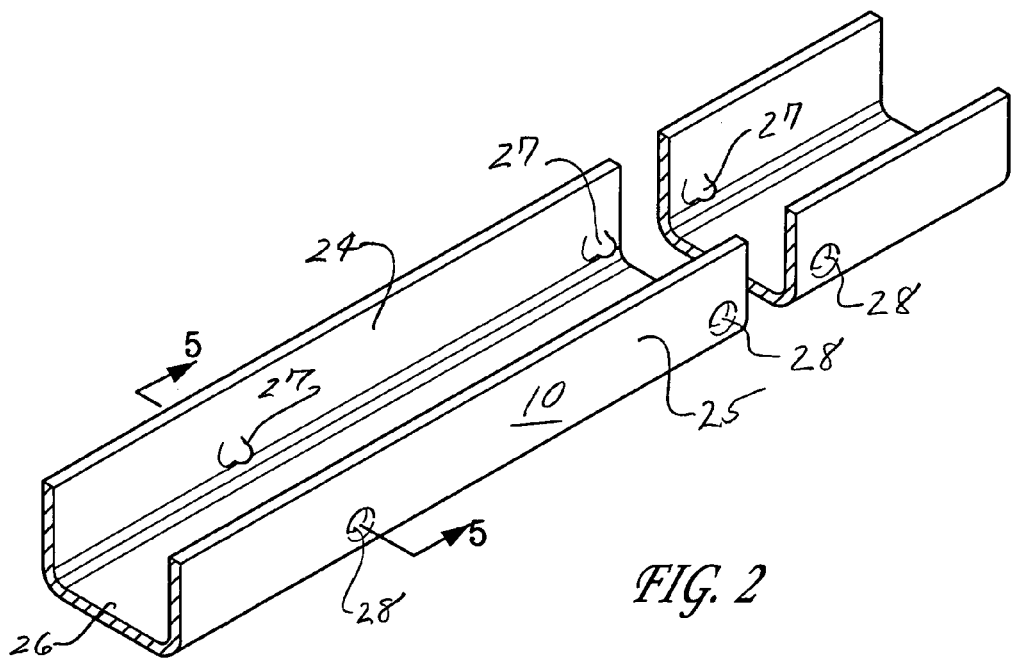
FIG. 2 is a perspective view of a section of U-shaped channel incorporating spaced apart pairs of projections for securing an inflatable sealing element.

Referring now to the drawings, and initially to FIGS. 1–6 thereof, the reference numeral 10 designates generally a U-shaped retainer for containing an elastomeric inflatable seal 11. In accordance with known principles, the retainer and seal may be of any suitable length and configuration. Typically, but not necessarily, the seal and retainer are in some form of closed configuration, providing a complete peripheral seal between an opening and a door, hatch or the like used to close that opening.

The inflatable seal 11 shown in the drawings is of a well-known style, available from The Presray Corporation, Pawling, N.Y. The seal can be formed from various elastomeric materials, such as EPDM, silicone rubber, butyl rubber, neoprene, nitrile and natural rubber. The seal is a fabricated cross section including a flat base portion 12 of a relatively thick section, in order to provide stiffness. The outer edges 13, 14 of the flat base are rounded as at 13, 14. Flexible side walls 15, 16 extend generally upward from the base 12, from positions at least slightly inward of the edge extremities of the base, forming concave grooves 17, 18 (FIG. 6) along upper edge portions of the base, extending along the full length of the seal.

As is evident in FIG. 6, upper wall portions 19, 20 of the seal are joined integrally with the side walls 15, 16 and, in the rest position of the seal, extend downward toward the base, joining with opposite side edges of a sealing rib 21. Preferably, the cross section of the seal incorporates a suitable fabric reinforcement such that, when the seal is inflated, it can change its cross sectional shape (see dotted line configuration in FIG. 6) without significantly changing its circumferential dimensions.

In accordance with generally known procedures, a sealing element of the type shown in FIG. 6 is commonly received in its retaining channel 10, which is mounted in a position to engage (or be spaced a short distance away from) the confronting surface 22 of a door, hatch or other panel 23 (FIGS. 9 and 10) when the latter is in its nominally closed position, as shown in FIG. 10. After closing and mechanically fastening the door or other element 23, the seal 11 can be inflated, typically by air, causing the seal to expand and the sealing rib to be displaced toward and into sealing contact with the surface 22.

To advantage, the retaining channel 10 can be formed of a sheet metal material, for example aluminum or steel, which can be bent into a generally U-shaped configuration as shown in the drawings. The channel 10 is shaped according to the panel to be sealed. For example, in the illustration of FIG. 9, the channel 10 and seal 11 would be configured as a rectangle. At corner areas of the rectangle, the channel sections, and sections of the inflatable sealing element 11 can be mitered, or rounded corners can be fabricated (as for example shown in the previously mentioned Schroth U.S. Pat. No. 3,984,942). The cross section of the retainer channel 10 is of course sized according to the dimensions of the inflatable sealing element intended to be installed therein. The opposite side walls 24, 25 are parallel and generally at right angles to the bottom wall 26 of the channel, as shown for example in FIGS. 1 and 2. The height of the side walls 24, 25 is such that their upper edges preferably extend at least slightly above the side walls of the inflatable sealing element 11 in its deflated condition. This allows the closure element, including a sliding panel, for example, to be brought into a closed position without contacting any portion of the sealing element.

As shown in the drawings, the internal width of the retaining channel is slightly greater than the width of the base 12 of the sealing element. By way of example only, for a sealing element having a base width of ⅞th inch, the internal width of the retainer 10 may be approximately one inch. Preferably, the maximum width of the side walls 15, 16 of the sealing element, in the deflated configuration, is approximately one inch, such that the deflated seal is easily received within the channel 10.

Pursuant to one aspect of the invention, spaced apart pairs of projections 27, 28 are formed in the channel side walls 24, 25 at a level spaced somewhat above the bottom wall 26. In an assembly of the illustrated dimensions previously mentioned, the center lines of the projections might be about 0.20 inch above the internal surface of the bottom wall 26, and the projections advantageously can project laterally inward a distance of, for example, about 0.13 inch. The specific dimensions will vary with the dimensions of the seal and its retainer, as will be understood.

To particular advantage, the projections 27, 28 are formed by conventional dimpling machinery, which simply forces a mandrel laterally inward against the outer surface of the supported side walls 24, 25, locally deforming the side wall inwardly and forming a permanent dimple projection on the interior of the channel. Preferably, the projections are arranged in opposed or substantially opposed pairs, as distinguished from being arranged in a longitudinally staggered configuration as in the before mentioned Carlson and Schroth patents. The opposed pairs are spaced apart longitudinally a distance that can be empirically established for the service requirements. In a typical installation, involving a retainer and seal of the dimensions previously indicated herein, pairs of projections spaced apart about three inches longitudinally are adequate.

As indicated in the drawing, an internal space between an opposed pair of projections 27, 28 is somewhat less than the width of the seal base 12. In the example structure described, where the seal has a base width of ⅞th inch (0.875), the spacing between projections 27, 28 may be approximately ¾ of an inch (0.750). Thus, in order to install the sealing element, the base must be forced through the constricted space between individual pairs of projections. Thereafter, the projections are seated in the grooves 17, 18 formed between the base 12 and the side walls 15, 16, locking the sealing element in its installed position. Although the sealing element can be intentionally removed from its retaining channel, the projection pairs serve to effectively secure the sealing element in place for normal usage.

Figure 11:
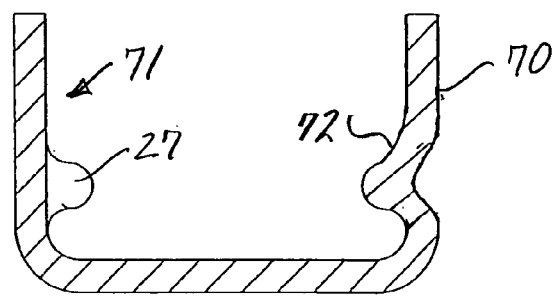
FIGS. 11 and 12 are cross sectional views of alternative forms of the invention, illustrating respectively mountings for a single seal and redundant seals.

In an alternative embodiment of the invention, shown in FIG. 11, one side wall 70 of the retainer 71 may be formed with a generally continuous, longitudinally extending projection 72 for engaging one side edge of the seal base 12. The continuous projection 72 can be formed as part of the initial shaping of the U-shaped retainer 71, as will be understood. On the side opposite the continuous projection, the retainer is formed with longitudinally spaced apart, localized projections, such as the dimples 27 for localized engagement and confinement of the seal base 12. When installing the seal in this alternative form of the invention, the seal base is tilted so that one edge thereof can be inserted under the generally continuous projection 72. Thereafter, the seal base is forced downward over the spaced apart localized projections 27 along the opposite side of the retainer.

For some applications, redundant seals are desired, so that failure of a seal, as from unintended deflation, does not compromise the closure. For such applications, an arrangement as shown in FIG. 7 can be utilized to advantage. The retainer channel 40 shown in FIG. 7 is approximately twice the width of the retainer channel 10 shown in FIGS. 1–5, so as to accommodate the side-by-side installation of two inflatable seals 41, 42. For purposes of illustration, the seals 41, 42 can be considered to be the same as the seal 11 previously described.

In the form of the invention illustrated in FIG. 7, a central wall 43 is installed in the retainer channel 40, by welding or other means, dividing the channel 40 into two parallel chambers. The illustrated divider wall 43 is formed with localized projections 48, 49 extending in opposite directions. If formed by dimpling, the projections 48, 49 are offset longitudinally at least a short distance. The divider 43 can be in the form of a flat wall, with localized projections 44, 45 formed in the opposite side walls 46, 47 of the channel 40, and in this instance, the projections 44, 45 are displaced longitudinally from each other in order to align with the projections 48, 49. Thus, for the left-hand channel as shown in FIG. 7, the projections 44, 48 form an opposed pair, and these projections are substantially aligned with each other. Likewise, for the right side channel, the projections 49, 45 form an opposed pair and are substantially aligned with each other. The individual channels thus function in exactly the same manner as previously described in connection with the embodiment of FIGS. 1–5. The spacing between opposed pairs of projections 44, 48 and 45, 49 is such that the base portions 12 of the seals 41, 42 must be forced through the constricted space between the projection pairs, after which the seals are effectively locked in operative positions for normal usage.

Figure 12:
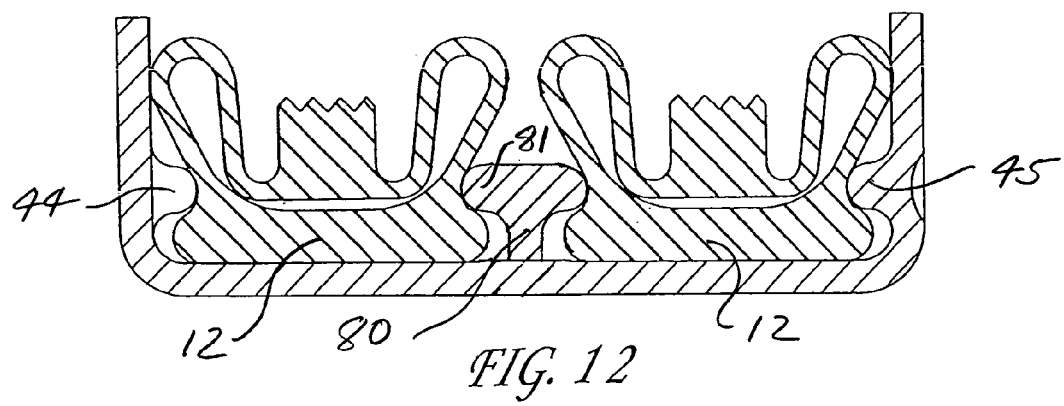

In an alternative form of the dual channel structure, shown in FIG. 12, the central divider 80 can be a continuous element of generally T-shaped cross section, with oppositely directed upper flanges 81 of the "T" forming generally continuous projections for engagement of the inner edges of the base portions 12 of the redundant seals. The continuous projections 81 of the divider element are opposed by longitudinally spaced apart localized projections 44, 45 formed on the outer walls of the retainer as previously described. Installation of the seals is accomplished by initially tilting the seal bases 12 such that their inner edges can be inserted underneath the generally continuous projections 81 extending along the divider element 80. Thereafter, outer edge portions of the seal bases 12 are forced past the spaced apart localized projections 44, 45 to complete the snap-in installation.

As a further alternative, the central divider of the redundant seal configuration may be formed by a series of longitudinally spaced apart clip elements (not specifically illustrated) of T-shaped configuration, which will function in substantially the same manner at the continuous T-shaped divider. The clip elements in this alternative embodiment are opposed by localized projections 44, 45 as in the embodiment of FIG. 12.

In the principal embodiment of the invention, shown in FIG. 1, the use of opposed localized projection pairs for securing the inflatable seals in their retaining channels greatly simplifies and expedites the fabrication of inflatable seal assemblies, significantly reducing manufacturing costs without in any way compromising performance. The retainers can be easily fabricated from sheet metal material, which is formed to the desired channel configuration and provided with spaced pairs of internal projections, preferably by a simple dimpling procedure but alternatively by other means such as by a localized deposit or weld material, for example. The manufacture of the retainer itself is simple and economical, and the installation of the seal therein can be expeditiously accomplished.

The principles of the invention can be readily applied to redundant seals installed on a side-by-side basis by utilizing a central divider wall, where the divider wall is provided with oppositely extending projections aligned with projections formed in the outer side walls of a multiple width channel, such that the projections are provided in opposed, substantially aligned pairs in each section of the multiple channel retainer.

In alternative embodiments of the invention, one side of the retainer structure may be provided with a generally continuous form of seal base-engaging projection provided that, on the opposite wall of the retainer, the projections are longitudinally spaced and localized to facilitate a snap-in installation of one side of the seal base. In all embodiments of the invention, the localized projections along one side of the retainer are directly opposed by projections on the opposite side of the retainer, whether of a localized or continuous nature.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A closure seal including an elongated pneumatically inflatable sealing element and means for mounting and retaining said sealing element, wherein
    (a) said sealing element comprises an elongated section of elastomeric material including a relatively stiff and flat base portion of predetermined width and a flexible portion comprising spaced apart side wall portions joining opposite side edge portions of said base portion and an outer wall portion joining with said side wall portions and forming therewith a hollow, expandable portion,
    (b) said base portion being of greater thickness than said side wall portions and having opposite side edge extremities projecting beyond lower portions of said side wall portions to form shoulders,
    (c) said mounting and retaining means comprising a channel member of u-shaped cross section having a base wall and spaced apart side walls defining a reception channel for said sealing element, (d) said channel side walls being spaced apart a distance slightly greater than the predetermined width of said sealing element base portion whereby said base portion can be positioned against the base wall of said channel member,
(e) a plurality of longitudinally spaced apart, opposed pairs of projections extending inwardly from said channel side walls and forming respective longitudinally spaced apart constrictions in said reception channel,
(f) said projections being spaced from said base wall a distance to engage said shoulders,
(g) the width of said constrictions being at least slightly less than the width of said base portion, whereby said base portion may be forced past said constrictions and thereafter retained in said mounting and retaining means by engagement of said projections with said shoulders.

2. A closure seal according to claim 1, wherein
(a) said mounting and retaining means being formed of sheet metal material, and
(b) said projections are formed in said sheet metal by forming dimples therein.

3. A closure seal according to claim 1, wherein
(a) said seal comprises a plurality of said sealing elements arranged in a side-by-side orientation,
(b) said channel member has a width to accommodate said plurality of sealing elements,
(c) a divider wall is fixed to the base wall of said channel member between adjacent sealing elements to define separate retaining spaces for said plurality of sealing elements,
(d) said divider wall is formed with projections extending in opposite directions into adjacent seal retaining spaces,
(e) said projections for each seal retaining space being formed in longitudinally spaced apart opposed pairs.

4. A closure seal according to claim 3, wherein
(a) said projections are formed by pressing dimples into the material of said channel member and divider wall.

5. A closure seal according to claim 4, wherein
(a) said channel member and said divider wall are formed of sheet metal.

6. A closure seal including an elongated pneumatically inflatable sealing element and means for mounting and retaining said sealing element, wherein
(a) said sealing element comprises an elongated section of elastomeric material including a relatively stiff and flat base portion of predetermined width and a flexible portion comprising spaced apart side wall portions joining opposite side edge portions of said base portion and an outer wall portion joining with said side wall portions and forming therewith a hollow, expandable portion,
(b) said base portion being of greater thickness than said side wall portions and having opposite side edge extremities projecting beyond lower portions of said side wall portions to form shoulders,
(c) said mounting and retaining means comprising a channel member of U-shaped cross section having a base wall and spaced apart side walls defining a reception channel for said sealing element,
(d) said channel side walls being spaced apart a distance slightly greater than the predetermined width of said sealing element base portion whereby said base portion can be positioned against the base wall of said channel member,
(e) a first plurality of longitudinally spaced apart localized projections extending inwardly from one of said channel side walls,
(f) projection means formed on the other said side wall of said retainer and having portions substantially directly opposite said localized projections and forming with said localized projections respective longitudinally spaced apart constrictions in said reception channel,
(g) said projections and projection means being spaced from said base wall a distance to engage said shoulders,
(h) the width of said constrictions being at least slightly less than the width of said base portion, whereby said base portion may be forced past said constrictions and thereafter retained in said mounting and retaining means by engagement of said projections with said shoulders.

7. A closure seal according to claim 6, wherein
(a) said projection means comprises a second plurality of longitudinally spaced-apart, localized projections arranged with said first plurality of localized projections to form opposed pairs of localized projections.

8. A closure seal according to claim 6, wherein
(a) said projection means comprises a generally continuous projection formed in one said side wall of said channel.

9. A closure seal according to claim 6, wherein
(a) said closure seal comprises a plurality of said sealing elements arranged in a side-by-side orientation,
(b) said channel member has a width to accommodate said plurality of sealing elements,
(c) a divider wall is fixed to the base wall of said channel member between adjacent sealing elements to define separate retaining spaces for said plurality of sealing elements,
(d) said divider wall is formed with lateral projections extending in opposite directions into adjacent seal retaining spaces and extending generally continuously along said divider wall,
(e) said localized projections and said projection means cooperating with said lateral projections form constrictions of at least slightly less width than the width of said base portion, whereby said base portion may be forced past said localized projections, said projection means, and said lateral projections and thereafter retained in said mounting and retaining means.

10. A closure seal according to claim 6, wherein
(a) said closure seal comprises a plurality of said sealing elements arranged in a side-by-side orientation,
(b) said channel member has a width to accommodate said plurality of sealing elements,
(c) divider means are fixed to the base wall of said channel member between adjacent sealing elements to define separate retaining spaces for said plurality of sealing elements,
(d) said divider means comprises spaced apart divider elements formed with lateral projections extending in opposite directions into adjacent seal retaining spaces,
(e) said localized projections and said projection means cooperating with said lateral projections form constrictions of at least slightly less width than the width of said base portion, whereby said base portion may be forced past said localized projections said projection means, and said lateral projections and thereafter retained in said mounting and retaining means.

* * * * *